United States Patent
Motosugi et al.

[11] Patent Number: 5,975,165
[45] Date of Patent: Nov. 2, 1999

[54] REFUELING NOZZLE

[75] Inventors: Kenji Motosugi, Kawagoe; Zenjiro Odera, Naka-gun, both of Japan

[73] Assignee: Hoechst Aktiengesellschaft, Frankfurt, Germany

[21] Appl. No.: 08/579,834

[22] Filed: Dec. 28, 1995

[30] Foreign Application Priority Data

Dec. 28, 1994 [JP] Japan ................................ 6-327800

[51] Int. Cl.[6] .............................................. B65B 1/04
[52] U.S. Cl. ........................... 141/392; 141/59; 141/83; 141/94; 141/95
[58] Field of Search ........................... 141/59, 392, 83, 141/94, 95, 206–228

[56] References Cited

U.S. PATENT DOCUMENTS

| | | | |
|---|---|---|---|
| 2,208,989 | 7/1940 | Lewis | 221/84 |
| 2,703,194 | 3/1955 | White | 141/325 |
| 4,166,485 | 9/1979 | Wokas | 141/52 |
| 5,069,260 | 12/1991 | Shea | 141/217 |
| 5,184,309 | 2/1993 | Simpson et al. | 141/392 |
| 5,267,592 | 12/1993 | Kaplan et al. | 141/392 |
| 5,277,233 | 1/1994 | Fleming | 141/201 |
| 5,309,957 | 5/1994 | Saisuu | 141/83 |
| 5,829,491 | 11/1998 | Bennett | 141/59 |

FOREIGN PATENT DOCUMENTS

| | | |
|---|---|---|
| 0 566 345 | 10/1993 | European Pat. Off. . |
| 7312600 | 3/1974 | Netherlands . |

*Primary Examiner*—David J. Walczak
*Assistant Examiner*—Timothy L. Maust
*Attorney, Agent, or Firm*—Frommer Lawrence & Haug LLP

[57] ABSTRACT

This invention relates to a refueling nozzle that can be inserted easily into a filler opening in such a manner as to seal up the filler opening, securely engaging the nozzle and opening, and thereby prevent erroneous operation. Additionally, the refueling nozzle can automatically stop or start the refueling. The fuel discharge unit 3 comprises a fitting member 9 in the shape of a truncated cone such that the cross-sectional diameter gradually becomes smaller from a value larger than the inside diameter of the filler opening of a fuel tank. In the fitting member 9, a vapor passage 11 is formed to recover or discharge fuel vapor in the fuel tank. A fuel sensor 14 detects the presence of fuel and kind of fuel vapor present in the fuel tank through contact with the fuel vapor flowing through the vapor passage 11. A liquid level sensor 15 determines the surface level of fuel in the tank and whether the level of the fuel in the fuel tank has reached a predetermined level. A control unit C, responsive to outputs of the fuel sensor and liquid level sensor, controls the start and stop of refueling in the fuel tank.

10 Claims, 6 Drawing Sheets

REFUELING NOZZLE

BACKGROUND OF THE INVENTION

1. Field of the Invention

The present invention relates to a refueling nozzle which is suitable for use at an oil station, easily inserted and engaged in a fitting manner to a filler opening of a fuel tank and capable of avoiding any erroneous operation.

2. Description of the Related Arts

Discharge of fuel vapor must be prevented as much as possible at the time of refueling to a vehicle or vessel from the point of view of environmental protection and also to ensure the health of oil station personnel. Considering the current situation, and, moreover, a self-refueling system wherein customers are requested to make the refueling, discharge of fuel vapor has to be prevented more intensively and various proposals have been made for this purpose.

One of the means for avoiding discharge of fuel vapor is to seal up a gap which exists between a refueling nozzle and a filler opening. The Japanese Patent Laid-Open Publication No. 4697/93 discloses a method of sealing up a gap which exists between a head portion of a refueling nozzle and a filler opening by arranging, at the external circumference of the head portion of the refueling nozzle, a rubber berrow tube which can be filled with air and, after inserting the refueling nozzle into the fuel tank, filling up the berrow tube with air thereby inflating the portion of the berrow tube inserted into the fuel tank by filling the berrow tube with air. However, this method has the disadvantage that the structures of a refueling apparatus and a refueling nozzle have to be complicated because a mechanism is required to fill the rubber berrow tube with air and to exhausting the air therefrom.

The Japanese Patent Laid-Open Publication No. 97198/93 discloses an oil-proof rubber vapor collector which easily seals a filler opening by forming a head portion into a bell-flare shape. However, such a vapor collector cannot seal a filler opening of a fuel tank tightly.

Another function that a refueling nozzle is requested to have is that it is engaged fixed to a filler opening of a fuel tank. For example, the above Japanese Patent Laid-Open Publication No. 4697/93 discloses that the refueling nozzle can be engaged with the filler opening by inflating the part of the berrow tube inserted into the fuel tank. However, as explained above, this method has the problem that a mechanism for filling the rubber berrow tube with air and exhausting the air therefrom is required, thereby complicating the structures of the refueling apparatus and the refueling nozzle.

SUMMARY OF THE INVENTION

The present invention has been proposed to overcome the disadvantages explained above.

It is therefore object of the present invention to provide a refueling nozzle which can be easily inserted into a filler opening and seals up the filler opening in such a way that it is securely engaged therewith.

Another object of the present invention to provide a refueling nozzle which can be easily inserted into a filler opening, seals up the filler opening and is securely engaged therewith and prevents erroneous operations.

It is further object of the present invention to provide a refueling nozzle which can be easily inserted into a filler opening, seals up the filler opening and is securely engaged therewith and moreover automatically stops or starts the refueling.

In order to achieve the objects explained above, the present invention provides a refueling nozzle comprising a fuel discharge unit having a fuel discharge outlet at one end thereof and a body having a handle, wherein said fuel discharge unit has a fitting member formed in the shape of truncated cone so that the diameter of cross-section is gradually reduced toward the fuel discharge outlet from a value larger than the inner diameter of the filler opening of the fuel tank.

A vapor passage is formed through the fitting member to recover or discharge vapor of the fuel in the fuel tank; it is possible to include 1) a fuel sensor which makes contact with the fuel vapor passing through the fuel passage to determine the existence and kind of fuel vapor in the fuel tank, and 2) a liquid level sensor for detecting the fact that the level of the fuel in the fuel tank has reached a predetermined level and 3) a control unit responsive to outputs of the fuel sensor and liquid level sensor to control the start and stop of the refueling procedure.

The control unit confirms that the refueling nozzle is inserted into the fuel tank by detecting the existence of vapor of fuel in the fuel tank in response to the output from the fuel sensor, causes refueling to automatically start when it is determined that the kind of the fuel to be supplied to the fuel tank coincides with the kind of a fuel to be supplied from the refueling nozzle and causes refueling to automatically stop in response to the output of the liquid level sensor. Moreover, the control unit causes refueling to stop in response to the output of the fuel sensor when it is detected that the refueling nozzle is disengaged from the filler opening of the fuel tank during the refueling procedure.

The refueling nozzle further comprises a preset mechanism for presetting a desired amount of fuel and a flow meter for measuring an amount of fuel to be supplied, so that the control unit causes refueling to stop when an amount of supplied fuel has reached the desired amount.

Start and stop of refueling can be realized through a valve controlled to open or close by the control unit.

The fitting member of the refueling nozzle is formed in the shape of truncated cone where the minimum and maximum diameters thereof are set corresponding to the inside diameters of the filler openings of various kinds of fuel tanks. Therefore, when the refueling nozzle seals up the filler opening, it can be securely engaged therewith. Moreover, the control unit automatically controls the start and stop of the refueling, responsive to outputs from the fuel sensor and liquid level sensor.

BRIEF DESCRIPTION OF THE DRAWINGS

FIG. 2A depicts a cross-sectional view of the structure of a second embodiment of a refueling nozzle according to the present invention which has a vapor passage.

FIG. 3A depicts a cross-sectional view of the structure of a third embodiment of a refueling nozzle according to the present invention which has a fuel sensor and a liquid level sensor.

DESCRIPTION OF THE PREFERRED EMBODIMENTS

Figure 1:
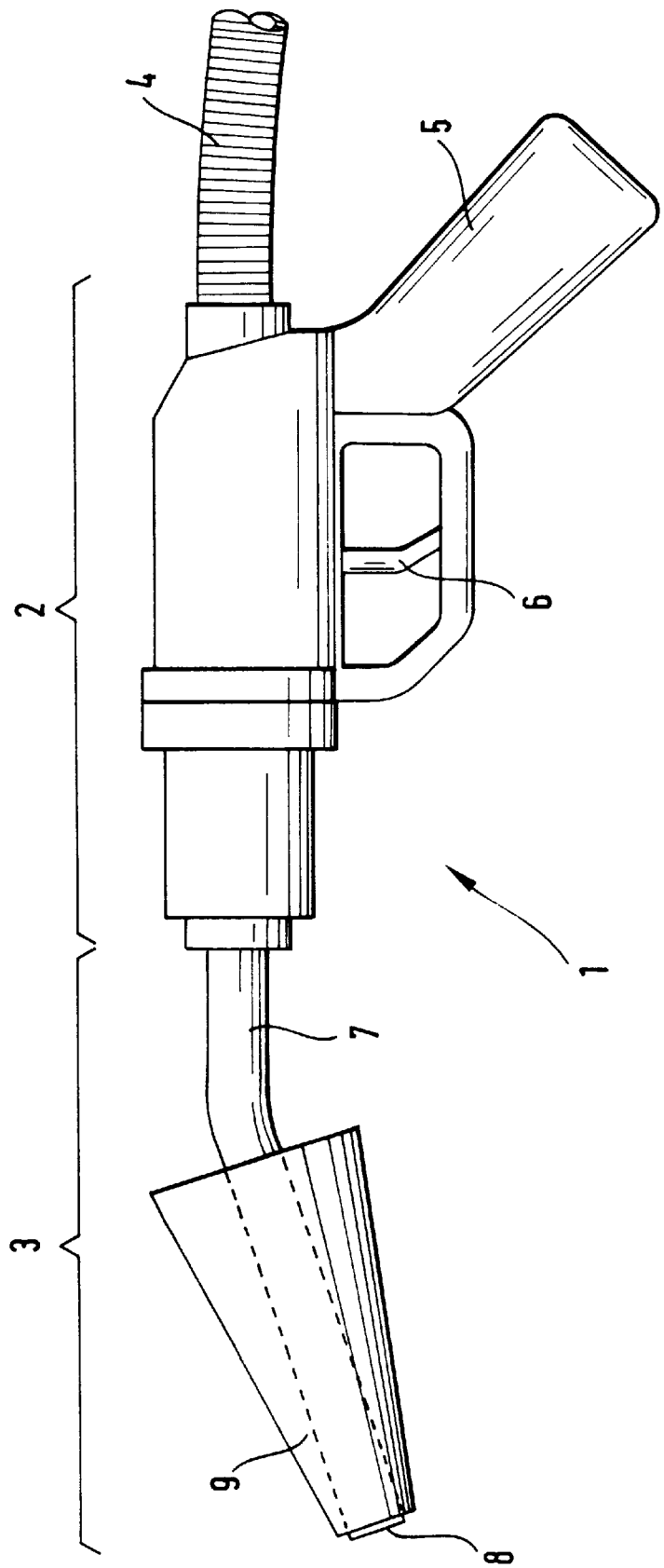
FIG. 1 schematically illustrates the structure of a first embodiment of a refueling nozzle according to the present invention which has a fitting member in the shape of a truncated cone.

Some preferred embodiments of the present invention will be explained hereunder in detail with reference to FIG. 1 to FIG. 5. Like elements are designated by the same reference numerals throughout the embodiments and the drawings.

FIG. 1 schematically illustrates the structure of a first embodiment of a refueling nozzle according to the present invention. In FIG. 1, a refueling nozzle 1 comprises a body 2 and a fuel discharge unit 3 coupled at one end to body 2. One end of body 2 is coupled, for example, with a refueling hose 4 to supply fuel from an underground reservoir. Like the refueling nozzle of the prior art, the nozzle of the present invention includes a handle 5 which is held by a worker at an oil station and a trigger 6 for starting or stopping the refueling. Fuel discharge unit 3 has a discharge pipe 7 one end of which is coupled to body 2 to feed the fuel supplied through refueling hose 4 to a fuel tank of a vehicle, etc. through a fuel discharge outlet 8 of discharge pipe 7.

The whole or a part of the external surface of discharge pipe 7 is covered by a fitting member 9, preferably made of an elastic material in the shape of truncated cone. In order to use refueling nozzle 1 for various purposes, it is necessary to 1) set the minimum diameter of fitting member 9 in a plane perpendicular to discharge pipe 7 to be smaller than the minimum inside diameters of filler openings usually used for vehicles, and 2) set the maximum diameter of fitting member 9 to be larger than the maximum inside diameters of the filler openings usually used for vehicles, the minimum diameter portion of fitting member 9 being positioned around fuel discharge outlet 8. Consequently, refueling nozzle 1 can fit into and seal up the filler openings which have various inside diameters employed currently and is securely engaged to each filler opening, thereby preventing release of vapor of fuel with a simplified structure. However, refueling nozzle 1 can be used for a single filler opening by setting the minimum diameter of fitting member 9 to be smaller than the inside diameter of the target filler opening and setting the maximum diameter of fitting member 9 to be larger than the inside diameter of the target filler opening. Moreover, it is possible, by preparing fitting members 9 of various sizes, to mount fitting member 9 to discharge pipe 7 depending on the inside diameter of the filler opening.

In a case of an ordinary refueling nozzle embodying refueling nozzle 1 illustrated in FIG. 1, fitting member 9 has, for example, a total length of 150 mm, a minimum diameter of 26 mm and the maximum diameter of 50 mm and is made of fluorine rubber material.

Figure 2:
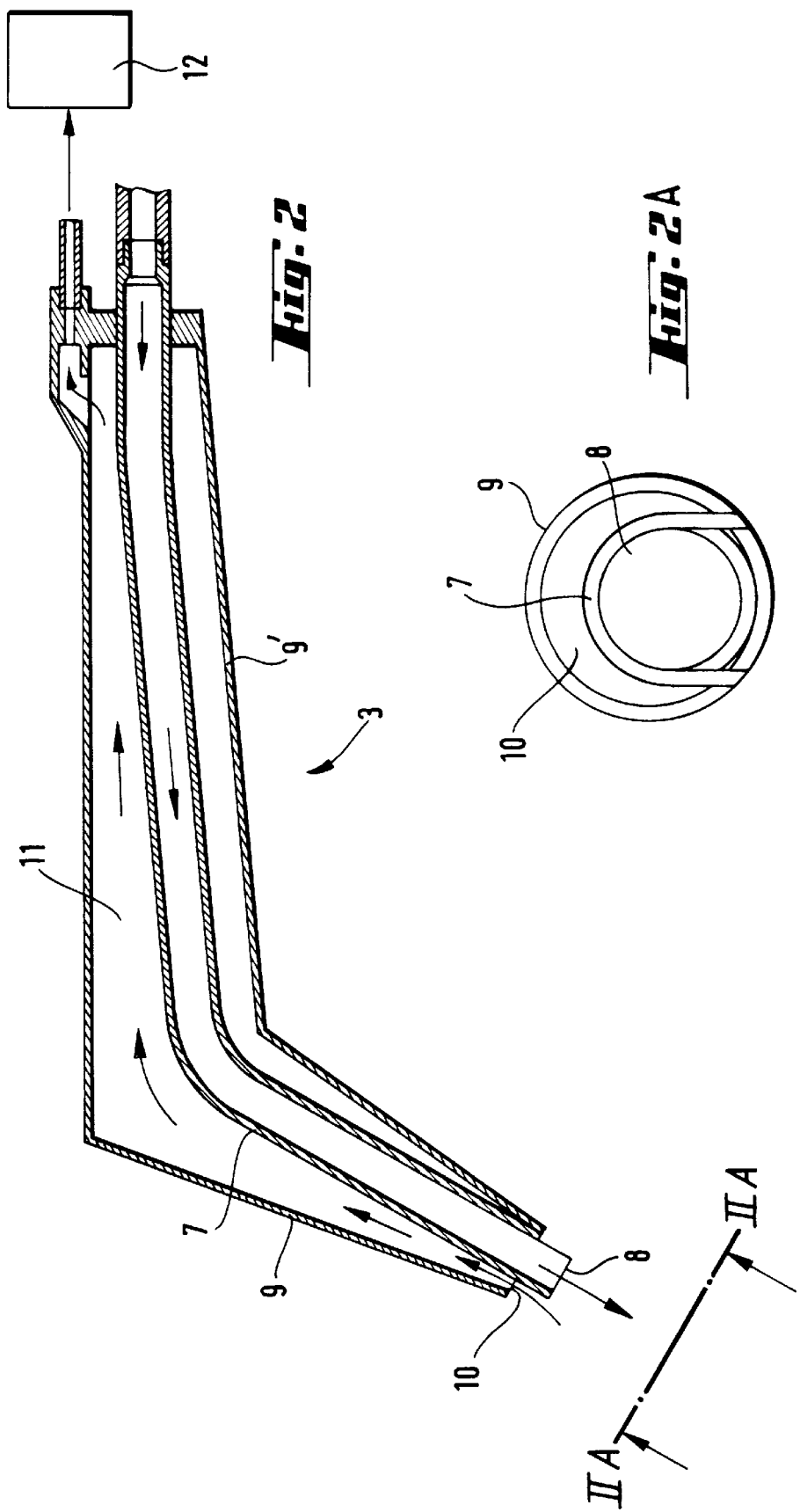
FIG. 2 schematically illustrates the structure of a second embodiment of a refueling nozzle according to the present invention which has a vapor passage.

FIG. 2 schematically illustrates the structure of a second embodiment of a refueling nozzle according to the present invention. In this figure, the structure of fuel discharge unit 3 is shown with a cross-sectional view. When fitting member 9 closes the filler opening of the fuel tank, an inside pressure of the fuel tank increases due to the rise in fuel level in the fuel tank during the refueling, resulting in the possibility that refueling nozzle 1 is disengaged from the filler opening. Therefore, it is necessary to provide refueling nozzle 1 with a mechanism for guiding a fuel vapor from the fuel tank to the outside. For this purpose, as shown in FIG. 2, fitting member 9 in the shape of truncated cone is provided to cover the portion of discharge pipe 7 inserted into the fuel tank, said discharge pipe 7 being bent at a desired angle in the middle. One end of a housing member 9' is coupled to fitting member 9 to surround the entire part of discharge pipe 7. A hole is formed at one end of fitting member 9 as a vapor inlet 10. A vapor passage 11 communicating with vapor inlet 10 is formed along fitting member 9 and housing member 9'. The other end of vapor passage 11 is connected to a vapor recovery/discharge unit 12. Vapor introduced into vapor passage 11 from vapor inlet 10 is supplied to vapor recovery unit 12 in order to be recovered in an area apart from a refueling worker or to pass through a fuel vapor absorbing mechanism so as to be converted into a harmless gas which is then discharged into the atmosphere by vapor discharge unit 12.

Figure 3:
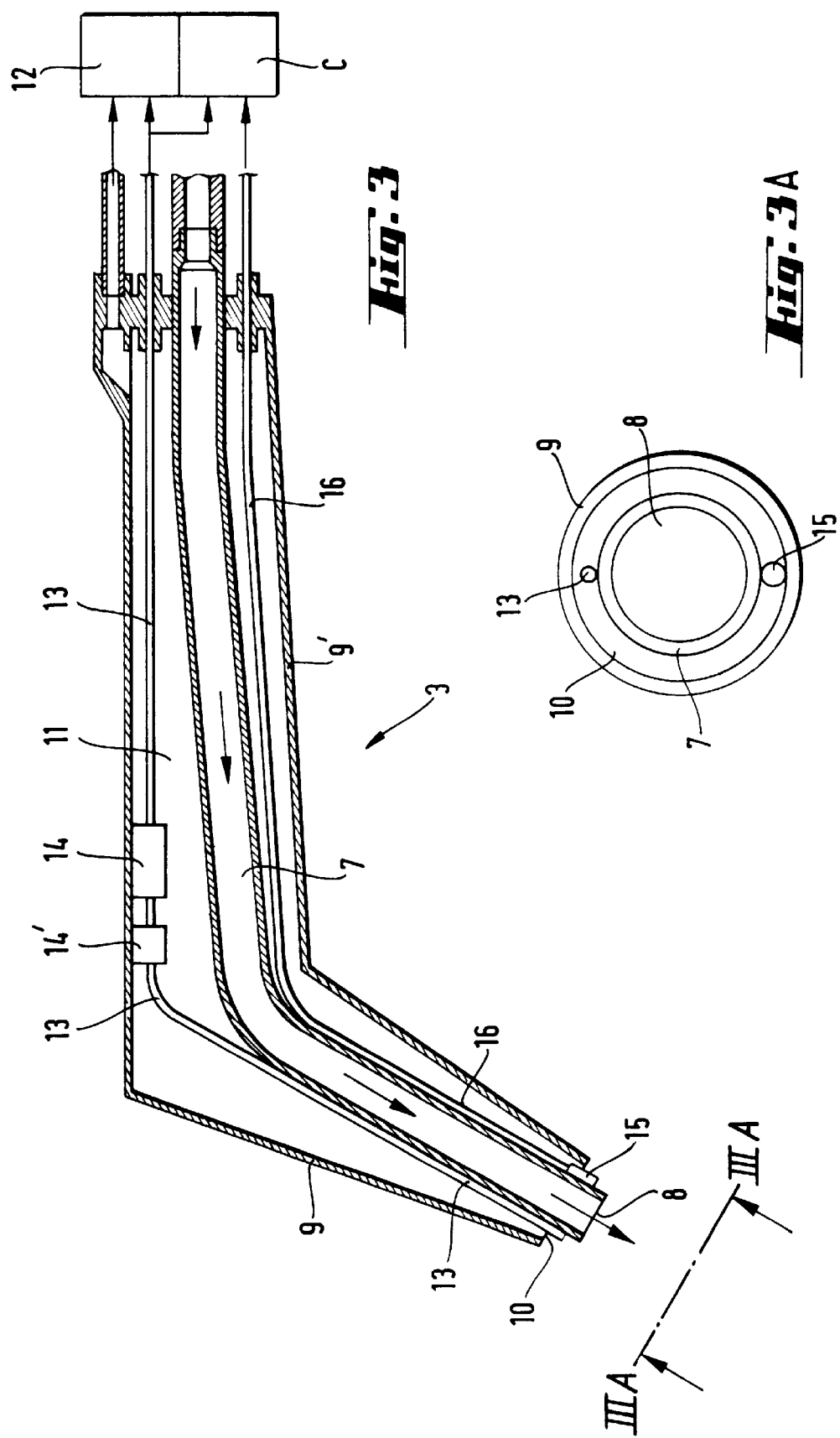
FIG. 3 schematically illustrates the structure of a third embodiment of a refueling nozzle according to the present invention which has a fuel sensor and a liquid level sensor.

FIG. 3 schematically illustrates the structure of a third embodiment of a refueling nozzle according to the present invention. Similar to FIG. 2, the structure of fuel discharge unit 3 is shown as a cross-sectional view. The third embodiment proposes a refueling nozzle for automatically starting and stopping refueling by adding various sensors to the model of the second embodiment. For example, a narrow tube 13, one end of which is projected to the outside of fitting member 9 from vapor inlet 10 and the other end of which is connected to vapor recovery unit 12, is provided within fitting member 9, for example, within vapor passage 11 along discharge pipe 7 of refueling nozzle 1 of 400 mm in length, 80 mm in width and 200 mm in height. A fuel sensor 14 having functions of detecting existence of fuel vapor and determining a kind of fuel is provided at an adequate position in the middle of narrow tube 13. Fuel sensor 14 is preferably mounted on or within the refueling nozzle for the purpose of achieving faster response rate. Fuel sensor 14 may comprise a contact combustion type gas sensor, a semiconductor gas sensor optical sensor to detect chemical substances which is disclosed in Japanese Patent Laid-open Publication No. 22206/94, said sensors functioning to determine existence and kind of vapor thereby outputting electrical signals to indicate as such. Electrical signals from fuel sensor 14 are then sent to an external control unit C through a signal line (not illustrated) running along a portion of tube 13 provided upstream a of fuel sensor 14. As shown in FIG. 3, a filter 14' may be provided before fuel sensor 14 for the purpose of purifying fuel vapor.

In order to cause vapor recovery unit 12 to guide vapor within the fuel tank to fuel sensor 14, a mechanism for generating a negative pressure by means of a pump or a system with Venturi effect may be provided inside or outside refueling nozzle 1. However, it is also possible to guide fuel vapor to the fuel sensor 14 without the mechanism explained above, after passing the fuel vapor through tube 13 from vapor inlet 10 by making use of a positive pressure generated in the fuel tank when refueling nozzle 1 is inserted into the fuel tank.

Meanwhile, a liquid level sensor 15 is provided near fuel discharge outlet 8 to supply a signal to control unit C through a signal line 16. Liquid level sensor 15 may be of any type using, for example, an ultrasonic wave system, thermistor system, optical system or diaphragm displacement system.

Since the third embodiment is constituted such as explained above, when fuel discharge unit 3 of refueling nozzle 1 is inserted into the filler opening of the fuel tank, fitting member 9 is securely fitted to the filler opening. Simultaneously, fuel sensor 14 informs control unit C of the presence of fuel vapor. Subsequently, fuel sensor 14 informs control unit C of the kind of vapor introduced into tube 13. Control unit C then determines whether or not the fuel detected in the fuel tank by fuel sensor 14 is the same as the fuel to be supplied by refueling nozzle 1. When the control unit determines that these fuels are the same as each other, the control unit causes automatic refueling to start by driving a refueling pump, after confirming that control unit C is not informed that liquid level sensor 15 has detected a fuel level in the fuel tank. On the other hand, when control unit C determines that a kind of the fuel informed by fuel sensor 14 is not the same as the fuel to be supplied by refueling nozzle 1 or if such determination is impossible, control unit C by means of an alarm mechanism A indicates such a condition by issuing a warning signal.

During refueling, fuel sensor 14 monitors vapor of the fuel introduced into tube 13. If refueling nozzle 1 is disengaged from the filler opening, any sudden change in the concentration of the fuel vapor is detected by fuel sensor 14 is then conveyed to control unit C. Control unit C then closes a valve provided between refueling nozzle 1 and the refueling pump, thereby stopping the refueling. When the refueling is continued and a fuel level in the fuel tank rises until the surface of the fuel comes into contact with or is close to the head of refueling nozzle 1, liquid level sensor 15 detects such a condition and notifies it to control unit C. Control unit C then closes the valve mentioned above and instructs the refueling pump to stop refueling.

Therefore, it is possible for refueling nozzle 1 to start refueling only when refueling nozzle 1 is inserted into the fuel tank and a kind of the fuel vapor within the fuel tank is the same as the fuel to be supplied by the refueling nozzle and to inhibit refueling in other cases. Moreover, since liquid level sensor 15 is provided to detect that the surface of fuel in the fuel tank comes into contact with or is close to the fuel discharge outlet 8 of refueling nozzle 1, refueling can be stopped when the fuel tank is full.

As can be understood from the matters above explained, trigger 6 (FIG. 1) can be provided in the refueling nozzle of the third embodiment. When a refueling worker inserts refueling nozzle 1 into the filler opening of the fuel tank, refueling is automatically carried out. In other words, fuel cannot be supplied until refueling nozzle 1 is inserted into the filler opening of the fuel tank by a refueling worker or when refueling nozzle 1 is disengaged from the filler opening during refueling for some reasons. Moreover, when fuel in the fuel tank is determined to be different from the fuel to be supplied, refueling is not carried out. When the fuel tank is detected to be full or an amount of fuel supplied has reached a predetermined level after refueling has been started, the refueling is automatically stopped. As explained above, since no trigger is provided, fuel supply by erroneous operation can be prevented; discharge of fuel to an area outside the fuel tank can be inhibited by fuel sensor 14. Since refueling is stopped when liquid level sensor 15 detects that the fuel tank is full, the fuel never overflows from the fuel tank if anyone operates refueling nozzle 1. In addition, since erroneous refueling operation is prevented by the fuel discriminating function of fuel sensor 14, any station worker who is not familiar with the manipulation of the refueling nozzle can safely and easily refuel a vehicle. Thus, a safer full-automatic refueling nozzle can be realized.

In the above explanation, fuel sensor 14 can detect the existence and a kind of fuel vapor, but it is also possible, in place of using the fuel sensor explained above, to individually connect, to tube 13, a sensor functioning to detect existence of fuel vapor and a sensor functioning to detect a kind of fuel vapor. Moreover, fuel sensor 14 having such functions may be provided at the outside of refueling nozzle 1.

Figure 4:
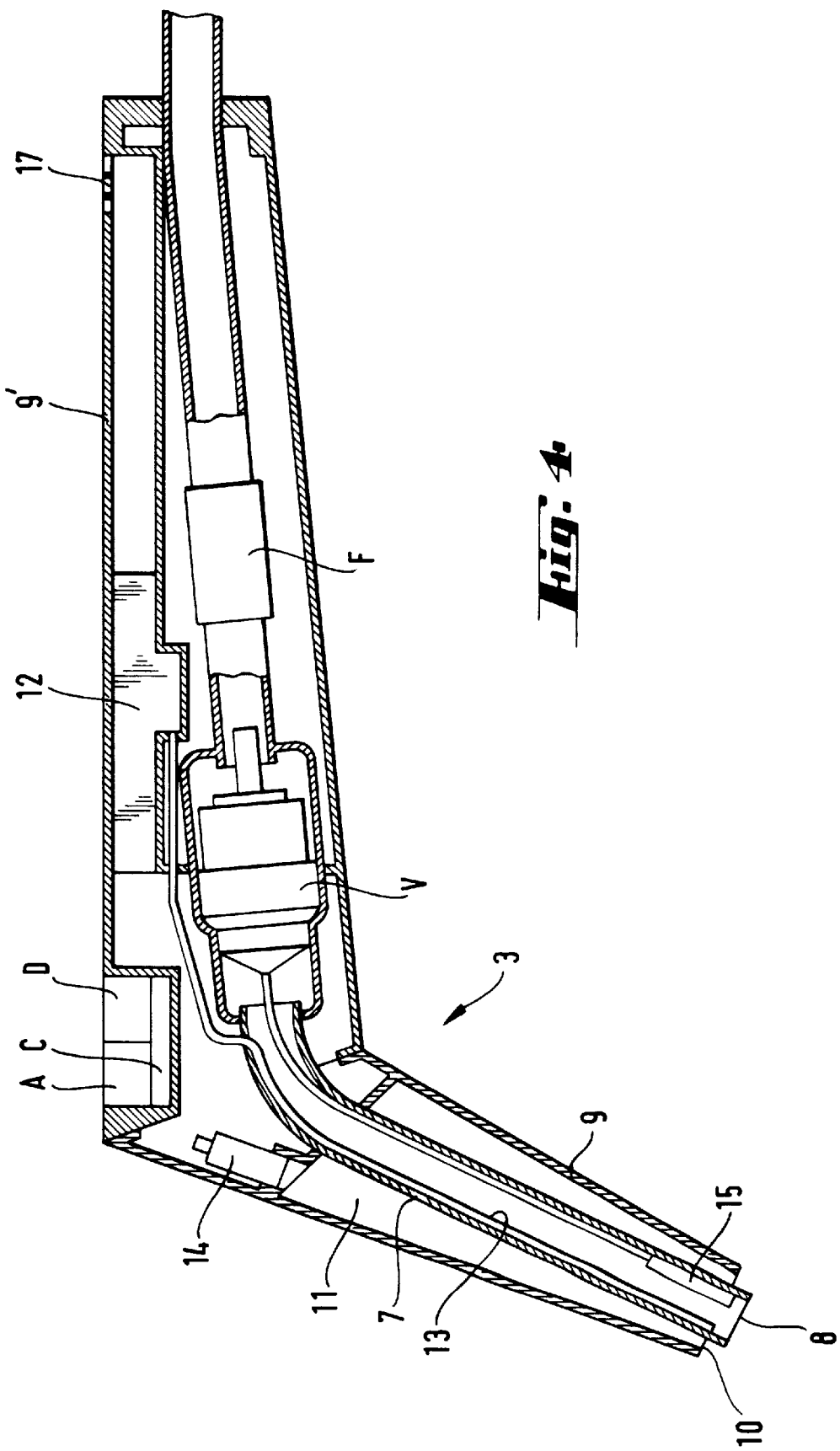
FIG. 4 schematically illustrates the structure of a fourth embodiment of a refueling nozzle according to the present invention which has a fuel sensor, a liquid level sensor, a solenoid valve, a flow meter, a flow rate setter/indicator and a control unit.

All the functions except that of a refueling pump of a conventional refueling apparatus can be provided on a refueling nozzle by mounting a preset mechanism for presetting an amount of fuel to be supplied and a flow meter to the refueling nozzle of the third embodiment. FIG. 4 schematically illustrates the structure of a fourth embodiment of a refueling nozzle according to the present invention. In this figure, the structure of a fuel discharge unit is indicated by a cross-sectional view. In the fourth embodiment, similar to the third embodiment, discharge pipe 7 is bent at a desired angle in the middle thereof and fitting member 9 in the shape of truncated cone is provided to cover a portion of the discharge pipe to be inserted into the fuel tank. Fuel sensor 14 functions to detect the existence and kind of fuel and is provided at the inside of fitting member 9 and liquid level sensor 15 for determining that the fuel in the fuel tank comes into contact or comes close to level sensor 15 provided near discharge outlet 8.

As shown in FIG. 4, in the fourth embodiment, housing member 9', coupled with fitting member 9, is provided to surround discharge pipe 7. Control unit C is disposed at an adequate position in the fitting member and a solenoid valve V is provided in the middle of discharge pipe 7 for opening or closing it. In the Upstream section of solenoid valve V, a flow meter F is provided for measuring an amount of fuel passing discharge pipe 7. Flow meter F can be located inside or outside of refueling nozzle 1. A flow rate setting/display unit D functioning to preset an amount of fuel and an alarm mechanism A for optically or audibly informing erroneous refueling are also provided at a position on an upper side of housing member 9' so as to be found easily by a refueling worker. Fuel sensor 14, liquid level sensor 15, flow rate setting/display unit D, flow meter F, solenoid valve V and a refueling pump (not illustrated) are electrically connected with control unit C.

One end of vapor passage 11 for recovery or discharge of fuel vapor in the fuel tank is communicated with vapor recovery unit 12 properly positioned in housing member 9'. Fuel vapor is recovered by vapor recovery unit 12 and purified air is then discharged to the outside from exhaust outlet 17. Tube 13 runs along the internal wall of discharge pipe 7 from an area near discharge outlet 8 and comes out of discharge pipe 7 near solenoid valve V and is then coupled to vapor recovery unit 12. Liquid which is produced by condensation in vapor recovery unit 12 returns to a fuel tank through tube 13.

In the fourth embodiment, the shortest portion of fitting member 9 is 165 mm, the longest portion thereof is 226 mm, the minimum diameter of fitting member 9 is 26 mm, the shortest portion of housing member 9' is 348 mm, the longest portion thereof is 374 mm and the minimum diameter of housing member 9' is 50 mm.

In the fourth embodiment, a desired amount of fuel to be supplied or full tank refueling, if desired, is preset to flow rate setting/displaying unit D, before fitting member 9 of refueling nozzle 1 is inserted into the filler opening of the fuel tank. When such presetting is completed, flow rate setting/display unit D sends an electrical signal to control unit C indicating that the desired amount of fuel is to be supplied or that the tank is to be filled. In response to such an electrical signal, control unit C changes the mode of operation to a what is called "specified amount refueling mode" or to "full tank refueling mode" and waits for the insertion of refueling nozzle 1 into the filler opening of the fuel tank. After refueling nozzle 1 is inserted into the filler opening of the fuel tank and fitting member 9 is securely fixed to the filler opening, fuel sensor 14 and liquid level sensor 15 execute the operations explained in regard to the third embodiment. In a case where control unit C confirms that the kind of fuel detected by fuel sensor 14 is the same as the fuel to be supplied from refueling nozzle 1, control unit C confirms that liquid level sensor 15 has not yet detected a surface level of the fuel, and activates the refueling pump and starts refueling by opening solenoid valve V. If control unit C determines that the kind of fuel notified from fuel sensor 14 does not coincide with the fuel to be supplied by refueling nozzle 1 or if control unit C cannot make a decision on fuel, control unit C causes alarm mechanism A to display to that effect or to generate an audible alarm.

During refueling, fuel sensor 14 monitors sucked fuel vapor. If fitting member 9 of refueling nozzle 1 is disengaged from the filler opening, the sudden change in fuel vapor concentration is detected by fuel sensor 14 which in turn notifies control unit C of such. As a result, control unit C immediately stops refueling by closing solenoid valve V. Simultaneously, flow meter F is measuring an amount of supplied fuel during refueling and continuously sends an electrical signal indicating such an integrated flow rate to control unit C. Upon receiving this signal, control unit C causes flow rate setting/display unit D to display an amount of integrated flow rate.

When a desired amount of fuel to be supplied is preset to flow rate setting/display unit D, control unit C monitors whether an amount of supplied fuel issued from flow meter F has reached the desired amount of fuel preset to the flow rate setting/display unit D. When the electrical signal indicates that the amount of supplied fuel has reached the desired amount of fuel, control unit C closes solenoid valve V to stop the refueling pump, resulting in termination of the refueling operation. In this case, when a liquid level in the fuel tank comes close to or is in contact with discharge outlet 8 before an amount of integrated flow rate measured by flow meter F reaches the desired amount of fuel, liquid level sensor 15 notifies this condition to control unit C. Therefore, control unit C closes electromagnetic valve V to stop the refueling pump, resulting in the termination of the refueling operation. Similarly, in a case where full tank refueling is preset to flow rate setting/display unit D, liquid level sensor 15 notifies control unit C that the fuel level in the fuel tank is rising and is close to or coming into contact with discharge outlet 8. Control unit C then closes solenoid valve V to stop the refueling pump, resulting in the termination of the refueling operation.

As explained above, in the fourth embodiment, since refueling nozzle 1 has almost all functions required for a refueling apparatus, the body of an existing refueling apparatus can be very small in size. Further, the body of a refueling apparatus can be eliminated by installing a refueling pump in an underground area, with the result that an oil station can be designed and managed effectively. Moreover, since flow meter F is provided in the middle of discharge pipe 7 and refueling is automatically stopped when an amount of fuel to be supplied has reached a desired amount or when a fuel tank becomes full, a safer full-automatic refueling nozzle can be realized.

Figure 5:
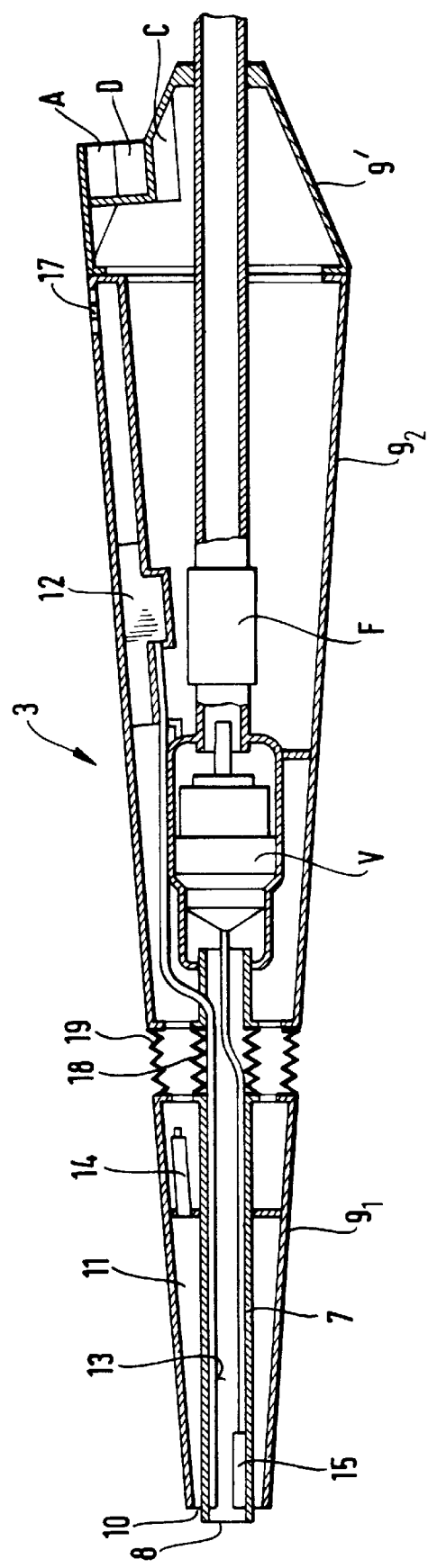
FIG. 5 schematically illustrates the structure of a fifth embodiment of a refueling nozzle according to the present invention wherein an intermediate part of a fuel discharge unit is made flexible.

FIG. 5 schematically illustrates the structure of a fifth embodiment of a refueling nozzle according to the present invention. The structure of fuel discharge unit 3 is shown in a cross-sectional view. In the fifth embodiment, a flexible pipe 18 is provided in the middle of discharge pipe 7, and a flexible berrow unit 19 is provided at a position corresponding to pipe 18 to fitting member 9 formed in the shape of truncated cone surrounding discharge pipe 7. At the position of flexible pipe 18, tube 13 and signal line 16 are also preferably flexible. Berrow unit 19 divides fitting member 9 into a small-diameter member 91 located in one side of berrow unit 19 and a large-diameter member 92 located in the other side of berrow unit 19. Housing member 9' is provided to couple with the maximum diameter portion of large-diameter member 92 of the fitting member, wherein control unit C, alarm mechanism A and flow rate setting/display unit D are disposed. The structure explained above allows fitting member 9 to be formed longer. Moreover, a flexible part provided in the middle allows a refueling nozzle to be applied to various types of filler openings of smaller to larger diameters located in various positions.

In FIG. 5, smaller-diameter member 91 has a length of 214 mm, berrow unit 18 has a length of 30 mm, large-diameter member 92 has a length of 351 mm and fitting member 9 has a maximum diameter of 124 mm, for example.

Figure 6:
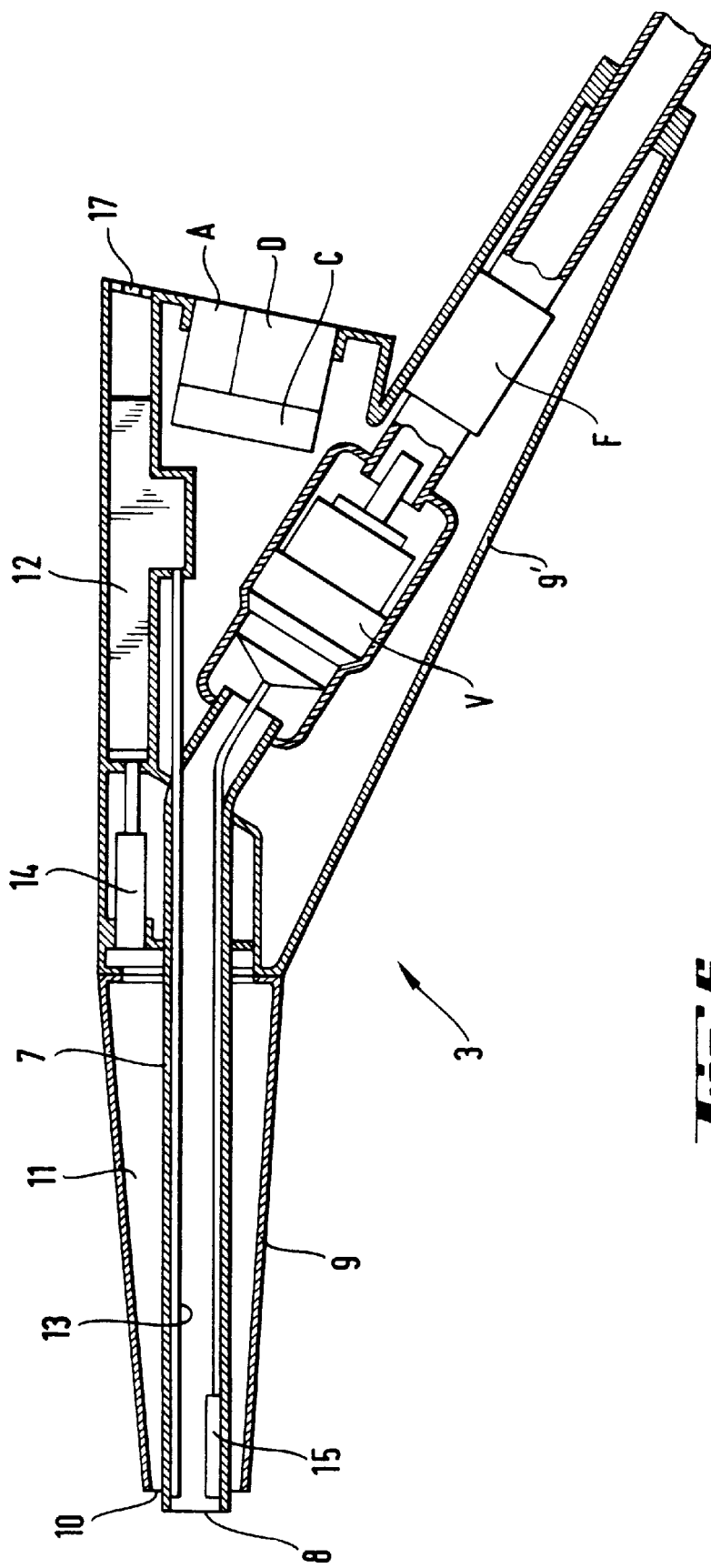
FIG. 6 schematically illustrates the structure of a sixth embodiment of a refueling nozzle according to the present invention wherein a truncated cone is formed by a fitting member and housing member.

FIG. 6 schematically illustrates the structure of a sixth embodiment of a refueling nozzle according to the present invention. The structure of fuel discharge unit 3 is shown in a cross-sectional view. In this embodiment, discharge pipe 7 is bent at a desired angle in the middle thereof, and one side (left side in the figure) of discharge pipe 7 is surrounded by fitting member 9 formed in the shape of truncated cone. Housing member 9' is provided externally of discharge pipe 7 to couple with the large-diameter side of the fitting member so that fitting member 9 and housing member 9' form one truncated cone. Control unit C, alarm mechanism A and flow rate setting/display unit D are disposed in the larger-diameter side of housing member 9'. This structure explained above allows the refueling nozzle to be applied to filler openings of various sizes. For example, fitting member 9 has a length of 160 mm, while the longest portion of housing member 9' is 300 mm and the shortest portion thereof is 210 mm.

In a further embodiment, an apparatus such as a safety valve can be applied in the nozzle to avoid the possibility that discharge pipe 7 is removed from fitting member 9 under a rising pressure inside the tank because of high resistance of fuel sensor to the vapor flow.

Furthermore, it is possible to use instead of a liquid level sensor an "Autostopping valve", which is an integrated valve including a liquid level sensor and a mechanical valve, as an apparatus to automatically stop refueling when a tank is full.

As is obvious from the above explanation of some preferred embodiments, the present invention can provide a refueling nozzle which can easily be inserted into a filler opening and seal up the filler opening and can securely be engaged therewith, thereby not only preventing erroneous operations but also automatically starting and stopping refueling operation.

We claim:

1. A refueling nozzle comprising a fuel discharge outlet at one end thereof;

a body not having a handle with a trigger;

a fitting member formed in the shape of a truncated cone in such a manner that the diameter of the cross section of said fitting member becomes gradually smaller from a larger value than the inside diameter of a filler opening of a fuel tank towards said fuel discharge outlet;

a liquid level sensor for detecting that fact that a liquid level of the fuel in the fuel tank has reached a predetermined level;

a vapor passage for recovering or discharging a vapor within the fuel tank; and a fuel sensor making contact with the fuel vapor passing through said vapor passage to determine the existence and kind of fuel vapor in the fuel tank to automatically control the start and stop of refueling.

2. A nozzle as set forth in claim 1 further comprising:

a control unit responsive to the outputs of said fuel sensor and said liquid sensor to control the start and stop of refueling of the fuel tank.

3. A nozzle as set forth in claim 2, wherein said control unit causes refueling to automatically start in response to the output of said fuel sensor when it is determined that the kind of a fuel to be supplied to the fuel tank is the same kind of a fuel to be supplied from said refueling nozzle and causes refueling to automatically stop in response to the output of said liquid level sensor.

4. A nozzle as set forth in claim 2, wherein said control unit causes refueling to stop in response to the output of said fuel sensor when it is detected that said refueling nozzle is disengaged from the filler opening of the fuel tank during refueling.

5. A nozzle as set forth in claim 2, further comprising a mechanism for presetting a desired amount of fuel and a flow meter for measuring an amount of supplied fuel, wherein said control unit causes refueling to stop when an amount of supplied fuel has reached the desired amount.

6. A nozzle as set forth in claim 2, further comprising a valve being opened and closed by said control unit to start and stop refueling.

7. The nozzle according to claim 1 which further comprises a discharge pipe containing a solenoid valve for opening and closing said pipe, a flow meter for measuring the amount of fuel passing through the discharge pipe, a flow rate setting/display unit functioning to a preset amount of fuel, and an alarm mechanism for optically or audibly informing erroneous refueling.

8. The nozzle according to claim 7, wherein a middle portion of the discharge pipe is flexible.

9. The nozzle according to claim 7, wherein a middle portion of the discharge pipe is bent.

10. A refueling nozzle comprising:

a fuel discharge unit having a fuel discharge outlet at one end thereof and a body having a handle, wherein said fuel discharge unit comprises a fitting member having a vapor passage through said fitting member for the purpose of recovering or discharging a vapor within the fuel tank, the fitting member being formed in the shape of a truncated cone in such a manner that the diameter of a cross section of said fitting member becomes gradually smaller from a value larger than the inside diameter of a filler opening of a fuel tank towards said fuel discharge outlet;

a fuel sensor making contact with the fuel vapor passing through said fuel passage to determine the existence and kind of fuel vapor in the fuel tank;

a liquid level sensor for detecting the fact that a liquid level of the fuel in the fuel tank has reached a predetermined level;

a control unit responsive to the outputs of said fuel sensor and said liquid level sensor, wherein said control unit automatically controls the start of refueling and causes refueling to automatically stop when it is detected that said refueling nozzle is disengaged from the filler opening of the fuel tank during refueling.

* * * * *